Figure 1:
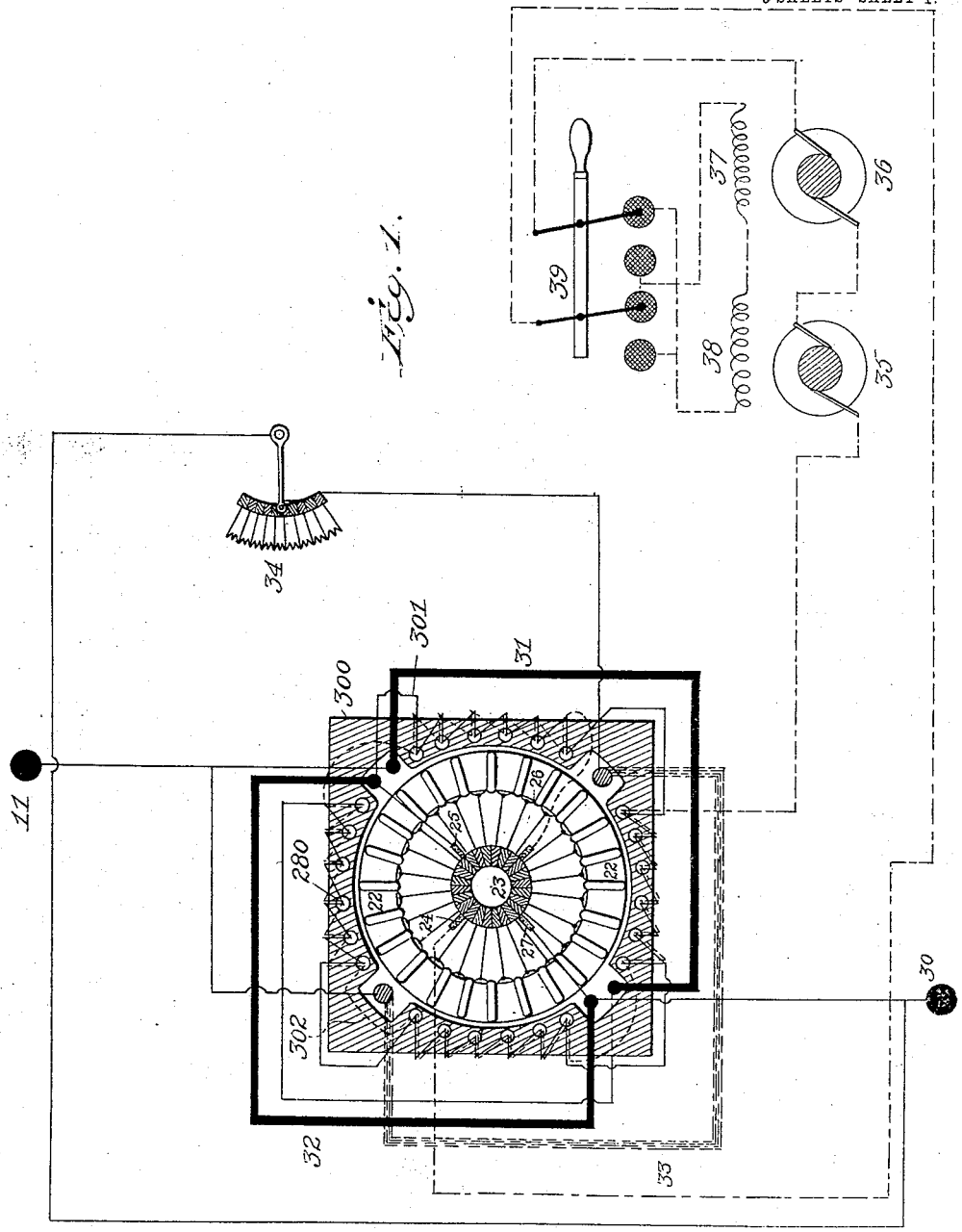

No. 791,983. PATENTED JUNE 6, 1905.
M. LEBLANC.
ELECTRICAL MOTOR GENERATOR.
APPLICATION FILED DEC. 9, 1904.

No. 791,983. PATENTED JUNE 6, 1905.
M. LEBLANC.
ELECTRICAL MOTOR GENERATOR.
APPLICATION FILED DEC. 9, 1904.

3 SHEETS—SHEET 2.

No. 791,983. PATENTED JUNE 6, 1905.
M. LEBLANC.
ELECTRICAL MOTOR GENERATOR.
APPLICATION FILED DEC. 9, 1904.

3 SHEETS—SHEET 3.

Witnesses:
Edwin L. Yewell
F. T. Chapman

Inventor:
Maurice Leblanc,
By Lyons & Bissing,
Attorneys.

No. 791,983. Patented June 6, 1905.

UNITED STATES PATENT OFFICE.

MAURICE LEBLANC, OF PARIS, FRANCE, ASSIGNOR TO THE WESTING-HOUSE ELECTRIC AND MANUFACTURING COMPANY, A CORPORATION OF PENNSYLVANIA.

ELECTRICAL MOTOR-GENERATOR.

SPECIFICATION forming part of Letters Patent No. 791,983, dated June 6, 1905.

Original application filed August 29, 1901, Serial No. 73,669. Divided and this application filed December 9, 1904. Serial No. 236,147.

*To all whom it may concern:*

Be it known that I, MAURICE LEBLANC, a citizen of the Republic of France, and a resident of Paris, France, have invented a new and useful Improvement in Electrical Motor-Generators, of which the following is a specification.

In systems of electrical traction as now commonly used there is a trolley-wire, which is coextensive with the track, with which the trolley on the vehicle is required to be in continuous contact. When overhead-trolley wires are employed, they are unsightly, and underground-trolley systems are exceedingly expensive. Now in an invention described in my application, Serial No. 73,669, filed August 29, 1901, of which this is a division, I do away with the need of continuous contact between the trolley-wire and the trolley and use instead a series of equally-spaced supply-points, at each of which sufficient electrical energy is fed to the vehicle to enable it to travel to the next supply-point with an ample surplus to take care of accidents. In this way when the supply-points are overhead it is no longer necessary to disfigure the streets with an unsightly trolley-wire. Instead there will be employed a series of ornamental posts spaced at suitable distances along the track, each of which posts will support a contact device through which the electricity can pass to the car when it reaches the posts in question; but the invention in the present application relates to the device on the car which is to act as a reservoir of electrical energy between two consecutive supply-points. I may say that if nothing had to be considered but the quantity of energy to be stored it would be found that a secondary battery of comparatively small weight would answer; but unfortunately it will be observed that such secondary battery will have to be recharged within an extremely short space of time—that is to say, during the passage of the car before a given supply-point. This means that the accumulator must have elements with large surfaces, and if to reduce weight very thin lead be employed the accumulator will be rapidly destroyed by local actions. For these reasons it will be found impossible to take advantage of the small capacity required for the battery for the purpose of making its weight appreciably less than that of a battery capable of serving for a complete trip. I have therefore used as a reservoir of energy on the car a fly-wheel rotating at a very high speed. This fly-wheel I accelerate in motion by an electric motor on the car, which is supplied with electrical energy at the supply-points. The fly-wheel then serves between the supply-points to run a dynamo on the car to furnish electricity to the driving-motors connected with the car-wheels. I have found that I can in this way store sufficient energy in the fly-wheel to carry the car a distance equal to that between two consecutive supply-points with an ample margin, for without subjecting the steel, of which I assume the fly-wheel to be built, to a greater strain than ten kilograms per square millimeter, which is a strain under which steel is normally worked, I can store therein two hundred thousand kilograms-meters of energy without giving the fly-wheel a greater weight than three hundred and twenty kilograms; but this energy is sufficient many times over to carry a heavy car between supply-points forty meters apart. The motor for driving the fly-wheel and the dynamo which the fly-wheel drives together constitute a motor-generator. I preferably construct this motor-generator by employing a single field wing or structure for both the motor and the generator and by having the common armature which rotates within this field-ring serve both for the motor and for the generator. Certain portions of the field-ring of this motor-generator are thereupon wound with the field-coils of the motor, and other portions of the field-ring are wound with the field-coil of the generator. Preferably the armature is built of sufficient weight and rigidity to serve as the fly-wheel and is supplied with a commutator and two dephased pairs of brushes, one pair for the motor and the other pair for the generator. In view of the fact that the fly-wheel dynamo is to rotate at very high speed I may support it in a frame hung on gimbal-joints, with the axis of rotation vertical, for the purpose of avoiding the evils of gyroscopic effects. For the purpose of avoiding nutational effects I may mount the armature of the fly-wheel dynamo in this frame by a ball-and-socket joint.

The above will serve to make the general purpose and design of my invention clear. In order that it may be understood in greater detail, I refer to the drawings, in which—

Figure 2:
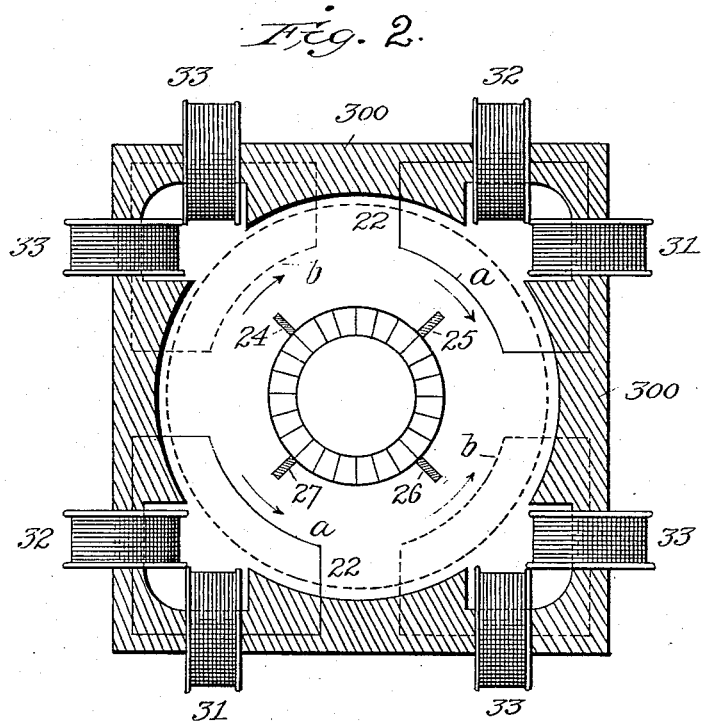
Figure 3:
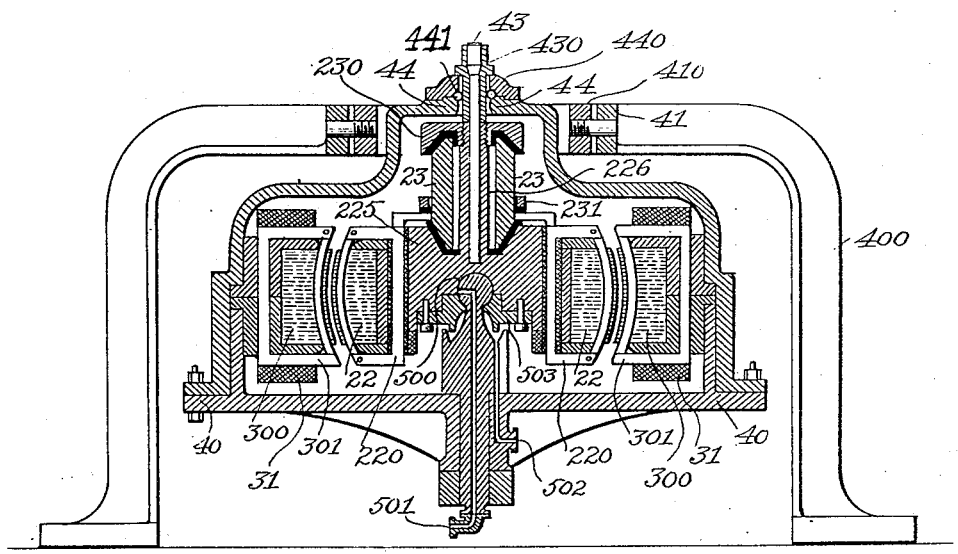
Figure 4:
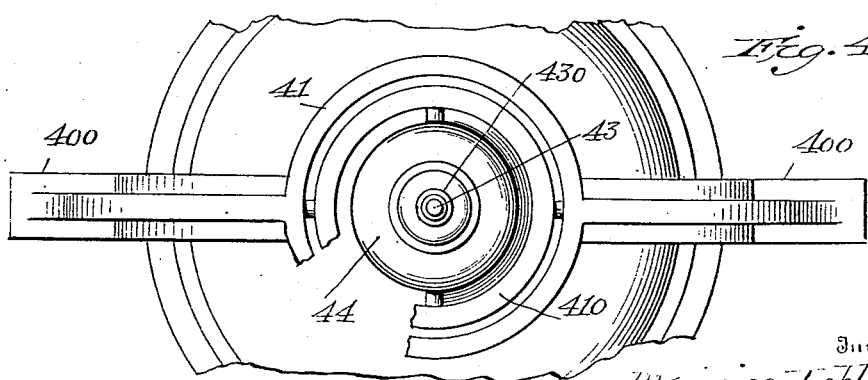

Figure 1 shows the motor-generator, the motor for driving the car, and a diagram of the circuit connections on the car. Fig. 2 shows the field-winding and field-frame of the motor-generator, and Fig. 3 shows a vertical section of the fly-wheel motor-generator. Fig. 4 is a detail of the motor-support.

The fly-wheel motor-generator which I employ is shown diagrammatically in Fig. 1 in connection with the driving-motors 35 36, which are supposed to be connected to the car-wheel. I employ for my motor-generator a single field structure 300, wound with motor-field coils 31 32 and with generator-field coils 33, which dual structure coöperates with a single common armature-ring 22. The field-coils are placed within diametrically opposite recesses in the field structure, as shown. The field-flux generated by the motor-field windings 31 32 is indicated at $a$ in Fig. 2, and the field-flux created by the generator-field winding 33 is indicated at $b$. It will be noted that the direction of the field-flux $a$, which is cut by the armature, is, generally speaking, at right angles to the direction of the field-flux $b$. Upon the commutator 23 of the armature 22 bear four brushes 25 27, 24 26, spaced ninety degrees apart. If these brushes are properly set, it will be seen that the current which enters by the brush 25 and issues by the brush 27 is influenced by the motor-field flux $a$, but is uninfluenced by the generator-field flux $b$. Similarly the current which enters by the brush 24 and issues by the brush 26 is influenced by the generator-field flux $b$, but is uninfluenced by the motor-field flux $a$. To avoid the necessity of a separate fly-wheel, I preferably build the armature 22 of steel stampings and heavy enough to act as a fly-wheel.

Both the generator and the motor of the motor-generator are required to operate under varying conditions of load and voltage, which means that the armature reactions will vary within considerable limits. Since it will be difficult, if not impossible, to compensate for this irregularity by shifting of the armature-brushes, I provide two neutralizing field-windings on the field structure—one, shown in full lines in Fig. 1 and designated by 301, which is intended to neutralize the armature reactions of the motor part of the motor-generator, and the other, designated by 302 and shown in broken lines in Fig. 1, for neutralizing the armature reactions of the generator part of the motor-generator. It will be seen that the winding 301 is laced through the apertures 280 and is connected in series with the brushes 25 27. Designating by A the current which flows across the brushes 25 27, the neutralizing field-winding 301 is so proportioned that the current A, flowing through this field-winding 301, will produce a flux in the line of the brushes 25 27 of an intensity equal but of a sign opposite to the flux produced in this same line by the action of the current A in the armature-coils. Stated in another way, there is opposite each armature-coil carrying the current A a neutralizing field-coil 301, carrying the same current A in the opposite direction, and thus neutralizing the magnetizing effect of this current in the armature-coil. Similarly, designating by B the current which flows across the armature from the brush 24 to the brush 26, it will be understood that the field-winding 302 is connected in series with the brushes 24 26 and that the current B, flowing in the field-winding 302, will set up a flux in the line of the brushes 24 26 of an intensity equal but of a sign opposite to that set up in this line by the action of the current B in the armature-coils. The field-windings 301 and 302 by neutralizing the effect of the armature magnetization neutralize the armature reactions, so that the motor and the generator of the motor-generator may operate under widely different conditions without requiring the position of the brushes to be changed.

If we trace the circuits for the motor part of the motor-generator, we have to begin with the point 11, which receives the current from the supply-point. The current passes from 11 to the field-coils 31, which are indicated by a heavy full line in Fig. 1, and thence through the apertures 280, along the four sides of the ring 300, through the neutralizing field-winding 301. The current thereupon passes to the brush 25, through the armature-coils to the brush 27, and thence to the common return 30, which is connected with the car-wheels. It will be seen that the motor field-coils 31 are in series with the armature. Their object is to reinforce the field at the moment when the current from the line begins to arrive and when the speed of the dynamo is at its minimum; but I also add a field-winding 32 in shunt of the brushes 25 27, which permits the motor to develop an opposing voltage which is precisely equal to that of the charging-line at the moment when the line-current is being interrupted. The motor part of the motor-generator is therefore compound wound. The actions of the motor field-windings are completed by the rheostats R, with which the ends of the trolleys 11 16 are provided. Under these conditions the closing and the breaking of the charging-circuit is not accompanied by sparks and a consequent loss of energy.

I must now trace the circuits of the generator part of the motor-generator. The field-coils 33 are represented by the broad dotted line 33 of Fig. 1. The field-circuit, including the field-coils 33 and a rheostat 34, extends between the points 11 and 30, between which a practically constant voltage is maintained. The armature-circuit of this generator passes from the brush 24 through the armature-coils to the brush 26 and thence through the neutralizing field-coil 302 to the armatures of the driving-motors 35 36, thence through a reversing-switch 39, through the series field-coils 38 37 of the driving-motors, and back to the brush 24. It will be seen that by varying the rheostat 34 the field excitation of the generator is varied, and with it the voltage developed between the brushes 24 26, and the current sent to the motors 35 36. By means of the reversing-switch 39 the driving-motors of the car can be converted into generators, whereby they become energetic brakes either when a stop is to be made or during the descent of a long slope. The energy given off by the car is thus not lost, but taken up by the fly-wheel dynamo. It may be mentioned in this connection that if the car should be stalled a considerable time by reason of some encumbrance on the road between two supply-points it will be sufficient to break the exciting-circuit of the fly-wheel dynamo. In that case the fly-wheel dynamo, having only to overcome its friction, will be able to rotate a long time before it stops.

It remains to describe the mechanical construction of my fly-wheel motor-generator. This has been indicated in Fig. 3. Since this motor-generator is to revolve at very high speed, I mount the same upon a standard 400, having a frame 41, connected by pivots to a second frame 410, which is in turn connected by pivots at right angles to the first to the frame 44—that is to say, the frame 44 is mounted upon the frame 400 by a double set of pivots constituting a universal or gimbal joint like that used in a mariner's compass. Connected to the downwardly-extending arms of the frame 44 is the base-plate 40, it being understood that the field-frame 300, in this case the stator of the motor-generator, is connected to the downwardly-extending arms of the frame 44 and that the armature 22, in this case the rotor of the motor-generator, is mounted on the base-plate 40 by means of a ball-joint 500, coöperating with the socket-plate 503, there being feed and exit for oil through the ports 501 and 502.

The field-coils 31 of the motor-generator are shown in section, and the neutralizing field-winding 301 is shown in elevation, as composed of copper strips. The armature-winding 220 is also shown as composed of copper strips and as connected to the segments of the commutator 23. The segments of the commutator 23 are rigidly clamped in place against the central body 225 of the armature 22 by means of cap-ring 230, which is screw-threaded upon a standard 226, rising from the central body 225. A clamping-ring 231, which surrounds the commutator-segments, serves to keep them from being torn apart by centrifugal force. The screw 43 serves to clamp the bearing-sleeve 430 rigidly against the standard 226, the parts 43, 430, 225, 226, 23, and 22 being thus firmly connected into one rigid structure.

It is to be noted that the outer surface of the armature 22 and the inner surface of the field structure 300 are built on the surfaces of spheres having as centers the center of the ball-and-socket joint 500. It is to be furthermore noted that the bearing-sleeve 430 may oscillate through a small arc within the steadying-plate 440, which is rigidly fastened to the frame 44. A ring of caoutchouc 441 of larger diameter than the bearing-sleeve 430 serves to keep this sleeve at or near the center of the orifice in the frame 44 and steadying-plate 440.

I may say that I have not indicated the brushes which bear upon the commutator in Fig. 3, so as not to crowd the drawings. Neither have I shown the several wires which lead to the various parts of the motor-generator.

It will be readily understood that by suspending the shaft of my fly-wheel dynamo in a vertical direction and from gimbal or universal joints no difficulty will be experienced by reason of any gyroscopic effects due to the high rotational speed of the fly-wheel—in this case the armature of the motor-generator. Again, it is to be understood that any dissymmetrical distribution of the weight of the fly-wheel will, by reason of its great speed, tend to produce harmful reactions on the bearings. There will be a tendency of the armature-axis to have a movement of nutation—that is to say, a tendency to wabble; but these harmful reactions in the bearings are done away with in the construction which I have adopted, this being due to the fact that the armature may turn on the universal ball-and-socket joint 500 without changing the air-space between the field and the armature, sufficient looseness or play for this purpose having been allowed in the upper bearing of the armature-axis.

While I have described my motor-generator as working with a direct current, it is manifest that this is not the only type of current which I may employ. The word "dynamo" is used in its generic sense as covering either a motor or a generator.

This application is a division of my application, Serial No. 73,669, filed August 29, 1901, in which parent application the claims are directed to the system of locomotion as a whole.

I claim—

1. A motor-generator comprising a field structure, having motor-field and generator-field windings, a common armature and a common commutator carrying a pair of motor-brushes and a dephased pair of generator-brushes, substantially as described.

2. A motor-generator comprising a field structure of the ring type provided with a motor-field winding for generating a motor-field flux and a generator-field winding for generating a generator-field flux dephased by ninety magnetic degrees from the motor-field flux, a common armature cutting the motor and the generator field fluxes, a common commutator, and a pair of motor-brushes and a dephased pair of generator-brushes each coöperating with the commutator, substantially as described.

3. A motor-generator comprising a field structure having motor-field and generator-field windings, a common armature and commutator having a pair of motor-brushes and a dephased pair of generator-brushes, a neutralizing field-winding in series with the motor-brushes, and a neutralizing field-winding in series with the generator-brushes, whereby the effect of armature reactions is overcome, substantially as described.

4. A motor-generator comprising a field structure of the ring type provided with sets of diametrically-situated pairs of recesses, motor-field windings in one set of recesses and generator-field windings in another set of recesses, a common armature, a common commutator, and a pair of motor-brushes and a dephased pair of generator-brushes each co-operating with the commutator, substantially as described.

5. A fly-wheel dynamo for rotating at high speeds, a frame for supporting the same with its axis of rotation approximately vertical, and a universal joint from which the frame is suspended, substantially as described.

6. A fly-wheel dynamo for rotating at high speed comprising a frame for supporting its stator and a universal joint for supporting its rotor, the surfaces of the rotor and stator adjacent to the air-gap being shaped as spheres having the universal joint for a center, substantially as described.

7. A fly-wheel dynamo for rotating at high speed comprising a frame for supporting its stator, a universal joint for supporting its rotor, the surfaces of the rotor and stator adjacent to the air-gap being shaped as spheres having the universal joint for center, and a standard on the rotor having a loose bearing in the frame, substantially as described.

8. A fly-wheel dynamo for rotating at high speeds comprising a frame for supporting its stator, a universal joint from which the frame is suspended, a universal joint for supporting the rotor of the dynamo upon the frame, the surface of the rotor and stator adjacent to the air-gap being shaped as spheres having the universal joint for center, and a standard on the rotor having a loose bearing in the frame, whereby harmful gyroscopic and nutational effects are avoided, substantially as described.

In testimony whereof I have signed my name to this specification in the presence of two subscribing witnesses.

MAURICE LEBLANC.

Witnesses:
ALBERT DELAT,
ARCHIBALD R. BAKER.